| United States Patent [19] | [11] | 3,996,337 |
|---|---|---|
| Stabenow et al. | [45] | Dec. 7, 1976 |

[54] CRYSTALLINE BERYLLO-ALUMINO-SILICATES AND PROCESS FOR THEIR MANUFACTURE

[75] Inventors: Joachim Stabenow, Weinheim; Laszlo Marosi, Ludwigshafen; Matthias Schwarzmann, Limburgerhof, all of Germany

[73] Assignee: BASF Aktiengesellschaft, Ludwigshafen (Rhine), Germany

[22] Filed: May 14, 1974

[21] Appl. No.: 469,802

[30] Foreign Application Priority Data

May 18, 1973 Germany .......................... 2325228

[52] U.S. Cl. .......................... 423/328; 252/455 Z; 423/329
[51] Int. Cl.² ......................................... C01B 33/28
[58] Field of Search ................... 423/328, 329, 330; 252/455 Z

[56] References Cited

UNITED STATES PATENTS

| 3,322,690 | 5/1967 | Bilisoly ........................... 252/455 Z |
| 3,328,119 | 6/1967 | Robson .............................. 423/328 |
| 3,365,272 | 1/1968 | Cornelius et al. ................. 423/329 |
| 3,431,219 | 3/1969 | Argauer ........................... 423/329 X |
| 3,911,088 | 10/1975 | Marosi et al. ...................... 423/329 |

OTHER PUBLICATIONS

Ueda et al., Molecular Sieve Zeolites–I, Advances in Chemistry Series, Am. Chem. Soc., 1971, pp. 135–139.

*Primary Examiner*—Edward J. Meros
*Attorney, Agent, or Firm*—Johnston, Keil, Thompson & Shurtleff

[57] ABSTRACT

Alkali metal beryllo-alumino-silicates of the mordenite type form, under hydrothermal conditions (100°–300° C in a Carius tube), from aqueous mixtures containing the structural components $SiO_2$, $Al_2O_3$ and BeO and alkali metal hydroxides. In beryllium-containing mordenites, ratios of $SiO_2$ to $Al_2O_3$ of from 10:1 to 120:1 may be achieved, whereas values of only up to 10:1 are known in the pure alumino-silicates of this type. The alkali metal beryllo-alumino-silicates are accessible to ion exchange in the same way as the beryllium-free representatives. The so-called $NH_4$- and H-forms obtaineable by ion exchange may be used for the synthesis of highly active sorption compositions or catalysts after calcination.

1 Claim, No Drawings

CRYSTALLINE BERYLLO-ALUMINO-SILICATES AND PROCESS FOR THEIR MANUFACTURE

The present invention relates to synthetic crystalline beryllo-alumino-silicates which may be regarded, structurally, as members of the mordenites (D-zeolites), and to a process for their manufacture.

Among the aluminum silicates, zeolites are nowadays of great economical importance. Over the past 10 years, zeolites have gained significance industrially as ion exchangers, molecular sieves and catalysts. They are used as, inter alia, selective absorbents for hydrocarbons and water or as catalysts for the catalytic dissociation of hydrocarbons by hydrogenation or as supports for active metals. The properties of zeolites, particularly their ability to act as ion exchangers or as molecular sieves or catalysts, are dependent on their structure. The zeolites are composed of $SiO_4$- and $AlO_4$-tetrahedrons joined together in three dimensions by oxygen atoms. This gives a three-dimensional network having cavities of specific size. These cavities contain both water molecules and cations which satisfy the electrovalency of the $AlO_4$-tetrahedrons.

The cations contained in the cavities, for example alkali metal or alkaline earth metal cations, are exchangeable and may be exchanged for other cations using generally known ion-exchange processes. Zeolites may be activated by heating them to a temperature at which the water of crystallization chemically combined in the cavities is liberated. After such activation, zeolites are capable of selectively absorbing gases and liquids.

Aluminosilicates of zeolite structure occur naturally in many different places. Zeolites are classified according to structural differences, the classes being named after naturally occurring representatives (analcite, natrolite, chabacite, phillipsite, heulandite, mordenite and faujasite). It has been possible since as early as 1937 and, in particular, since 1946 to manufacture synthetic zeolites by hydrothermal techniques following systematic research of the system $Na_2O/Al_2O_3/SiO_2/H_2O$.

Thus the manufacture of mordenite is described in a number of patent specifications and scientific papers. As typical representatives, mention may be made of papers by L. B. Sand and D. Domine and J. Qubex [see Molecular Sieves, Papers read at the Conference held at School of Pharmacy (University of London), London, Apr. 4–6, 1967; Editor Society of Chemical Industry, London, 1968, pp. 71 and 78].

The general molecular formula given for sodium representatives of these ortho-rhombic-crystallizing D-zeolites is $0.9 \pm 0.2\ Na_2O:Al_2O_3:WSiO_2:XH_2O$, in which W may be from 9 to 11 and X may have a value of from 0 to about 7.

Such D-zeolites are used in various forms for catalytic processes.

As mentioned above, it is an important feature of zeolite-type alumino-silicates that their properties may be varied by ion exchange. For example, it is possible to form the H-form or $NH_4$-form of a zeolite from the Na-form, the form preferably made in the synthesis of the zeolites. It is also possible to replace the alkali metal by alkaline earth metals such as magnesium, by heavy metals or by rare earth metals such as lanthanum or cerium. However, variation in the properties of zeolites by ion exchange alone is often possible only within narrow limits, since ion exchange causes no substantial change in the structure of the zeolite and thus in the properties thereof. For example, it is necessary for the zeolite to have an internal surface of an acidic nature when used for cracking hydrocarbons. The acid centers are produced by exchanging the cations for protons. The degree of acidity which can be achieved thereby depends to a large extend on the structure of the zeolite. In most zeolites it is substantially governed by their composition and variations therein are thus virtually impossible from the outset. For this reason, methods have already been developed for changing the zeolite structure. This may be achieved by replacing the elements silicon and aluminum, which are essential constituents of the structure, by other elements. Thus a paper by R. M. Barrer et al. in J. Chem.Soc., London 1959, pp. 195–208, discloses the replacement of aluminum or silicon in alumino-silicates either completely or partially by gallium or germanium. This produces alumino-germanates, gallo-silicates, or, when both elements are completely replaced, gallo-germanates, all of which are structurally members of the zeolite species and improve the zeolite spectrum by their special properties.

German Published Applications Nos. 1,959,241; 2,034,266; 2,034,267 and 2,034,268 describe synthetic crystalline zeolites which contain phosphorus in addition to aluminum and silicon. In these so-called alumino-silico-phosphates, the silicon has undergone isomorphic replacement by phosphorus, i.e. the three-dimensional network results from $AlO_4$-, $SiO_4$- and $PO_4$-tetrahedrons joined together by oxygen atoms. Crystallography shows that the substitution of silicon by phosphorus in the crystal lattice (i.e. in the tetrahedrons) causes reduction in the lattice constant. In addition to these crystallographic findings, the infra-red spectrum also demonstrates that silicon has been replaced by phosphorus. The said substituted zeolites are, like the unsubstituted zeolites, capable of ion exchange and may be similarly activated by heating. However, they show certain advantages over said unsubstituted zeolites. For example, the thermal resistance of the aluminosilicophosphates is said to be greater than that of aluminosilicates. The preparation of substituted aluminosilicates is in general more difficult than that of pure aluminosilicates, since uncontrollable side-reactions often occur.

When previous attempts to substitute aluminum or silicon in alumino-silicates are considered, it is seen that hitherto only elements in groups III, IV and V of the Periodic Table have been used. In the substitution of gallium for aluminum or of germanium for silicon, no change occurs as regards the lattice/cavity electrovalency. When silicon is replaced by phosphorus, the negative charge of the network is reduced, which means that a lower total number of cations may be introduced into the cavities of the three-dimensional network.

Previous knowledge of zeolites could not have led one to expect that the replacement of trivalent aluminum or quadrivalent silicon by divalent beryllium could give rise to compensation of the associated increased negative charge of the three-dimensional network by introduction of further cations into the cavities.

However, it has been found, surprisingly, that berylloaluminosilicates of D-zeolite structure may be prepared, which compounds contain up to 900% molar of beryllium oxide, based on aluminum oxide. Such zeolites are obtained by adding sodium beryllate to a reaction mixture containing an aluminum component and a silicon component. The surprising result is that in the beryllo-alumino-silicates, hereinafter referred to as beryllium zeolites, the molar ratio of $SiO_2$ to $Al_2O_3$ is greater than in pure alumino-silicates.

The invention relates to crystalline beryllo-alumino-silicates. These are characterized by the molar composition:

$$X\ M_{2/n}O \cdot Al_2O_3 \cdot Y\ SiO_2 \cdot Z\ BeO \cdot W\ H_2O$$

in which M denotes an exchangeable cation and $n$ is its valency and the coefficients have the following values: X from 0.8 to 11.2, Y from 10 to 120, Z from 0.01 to 10 and W from 0 to 7. The berylloalumino-silicates are also characterized by an X-ray diffraction pattern having at least the following d-values in angstrom units:

| d (A) |
|---|
| 13.50 = 0.25 |
| 10.00 ± 0.25 |
| 9.00 ± 0.25 |
| 6.50 ± 0.20 |
| 6.40 ± 0.20 |
| 6.00 ± 0.20 |
| 5.80 ± 0.20 |
| 4.50 ± 0.15 |
| 4.00 ± 0.15 |
| 3.47 ± 0.15 |
| 3.39 ± 0.1 |
| 3.21 ± 0.1 |
| 3.19 ± 0.1 |

The invention also relates to a process for the manufacture of crystalline beryllo-alumino-silicates. This process is characterized in that a mixture having the following molar composition:

| | | |
|---|---|---|
| $BeO/Al_2O_3$ | = | 0.05 – 10 |
| $SiO_2/Al_2O_3$ | = | 10 – 300 |
| $Na_2O/(Al_2O_3+BeO)$ | = | 1 – 6 |
| $H_2O/Na_2O$ | = | 30 – 500 | is prepared at room temperature and then heated in a pressure vessel at temperatures ranging from 100° to 300° C until a solid crystalline product is formed, whereupon said product is separated from the liquid, washed and dried.

The crystalline beryllium zeolites of the invention have the following composition, expressed in terms of molar proportions of the oxides:

$$X \cdot M_{2/n}O \cdot Al_2O_3 \cdot Y\ BeO \cdot Z\ SiO_2 \cdot W\ H_2O$$

where M denotes at least one exchangeable cation and n is its valency. We prefer to use alkali metals, particularly sodium, in the synthesis of beryllium zeolites. The coefficients in the above molecular formula stand for positive numbers in the following ranges: X from 0.8 to 11.2, Y from 10 to 120, Z from 0.01 to 10 and preferably from 0.2 to 9.0 and W from 0 to 7.

Beryllium zeolites D have a structure which is similar to that of the mineral mordenite. The d-values of the X-ray diffraction pattern may be assigned to an orthorhombic elementary cell. The dimensions of the elementary cell are dependent on the beryllium content of the zeolites and may be in the aforementioned range, higher beryllium contents giving a lower lattice constant of the beryllium zeolite. It is pointed out that the d-values and also the associated intensities are dependent on the beryllium and aluminum contents of the zeolite. It is believed that the beryllium substitution takes place according to one of the following mechanisms:

| | | | |
|---|---|---|---|
| (1) | $2(AlO_2)^-$ | = | $(BeSiO_4)^{2-}$ |
| (2) | $(AlO_2)^-$ | = | $(BeO(OH))^-$ |

However, other reaction mechanisms are conceivable, which may take place simultaneously in the crystal. The following findings show that beryllium is present in the beryllium zeolites produced by the process of the invention and has replaced aluminum. 1. X-ray determination of the crystallinity of the beryllium zeolites manufactured in the manner of Examples 1 to 11 shows that they are all 100% crystalline. 2. Electron microscope examination shows that the beryllium zeolites contain no amorphous impurities. 3. The substitution of aluminum by beryllium in the zeolite lattice would be expected to give a reduction in the lattice constant of the zeolite, because the Be-O bond length of about 1.60 A is much shorter than the Al-O bond length which is about 1.75 A (cf. International Tables for X-ray Crystallography, 1968, Vol. III, pp. 260 and 262).

The expectation is confirmed when the lattice constant of the beryllium-containing zeolite of Example 10 is compared with that of the corresponding beryllium-free zeolite (Example 12). 4. There is further evidence that beryllium engages in the reaction occurring in the manufacture of the beryllo-alumino-silicate and is introduced into the zeolite. The molar ratio of $SiO_2$ to $Al_2O_3$ is always greater in beryllium-containing zeolites than in the beryllium-free zeolites manufactured under identical reaction conditions. See the Examples. Thus in the beryllium zeolites molar ratios of $SiO_2$ to $Al_2O_3$ may reach values of from 10:1 to 120:1.

This is surprising, since the patent literature on unsubstituted alumino-silicates, zeolites D, states that the molar ratio of $SiO_2$ to $Al_2O_3$ can have values of up to 10:1 (cf. Sand and Domine loc.cit.).

The beryllium zeolites are manufactured from aqueous mixtures containing aluminum, silicic acid, beryllium and exchangeable cations. The molar composition of the said mixture must be kept within very strict limits in order to produce the desired beryllium-containing zeolites D by hydrothermal methods.

In the manufacture of the zeolites, we prefer to use, as exchangeable cations, alkali metals and in particular sodium. A particularly suitable source of beryllium is an aqueous sodium beryllate solution. To manufacture the sodium beryllate solution, a beryllium-containing mineral such as beryll may be digested. The alkaline digested solution of beryll, a mineral containing aluminum and silicon in addition to beryllium, may be directly used for the synthesis. The other reactants are silicic acid preparations such as silica gel, silica sol, silicic acid and sodium silicate. Particularly suitable sources of aluminum are active aluminum oxides such as $\gamma$-$Al_2O_3$, or sodium aluminate or aluminum hydroxides. To give the necessary pH's, we prefer to use alkali metal hydroxides providing the exchangeable cations.

The reactants are mixed cold in water and then treated hydrothermally until crystallization occurs. In order to obtain solid crystalline beryllium zeolites of the mordenite type (D type) as determined crystallographically, the mixture of reactants should have the following composition (oxide molar ratios):

| | | |
|---|---|---|
| BeO/Al₂O₃ | = | 0.05 to 10 |
| SiO₂/Al₂O₃ | = | 10 to 300 |
| Na₂O/(Al₂O₃+BeO) | = | 1 to 6 |
| H₂O/Na₂O | = | 30 to 500 |

Reaction mixtures of the following compositions (oxide molar ratios) are preferably used in the manufacture of beryllium zeolites:

| | | |
|---|---|---|
| BeO/Al₂O₃ | = | 0.05 to 7 |
| SiO₂/Al₂O₃ | = | 15 to 150 |
| Na₂O/(Al₂O₃+BeO) | = | 1 to 3 |
| H₂O/Na₂O | = | 30 to 250 |

The said reactants are mixed at room temperature and then placed in a pressure vessel, for example a Carius tube. The reaction mixture is then heated to from 100° to 300° C and held at this temperature under autogenous pressure until crystallization occurs. The crystals are separated from the aqueous phase by filtration and dried.

The resulting beryllium zeolites of the invention, preferably in the alkali metal form and particularly in the sodium form, may be subjected to ion exchange by treatment with aqueous solutions on monovalent, divalent, trivalent or quadrivalent metals. We particularly prefer to exchange the alkali metal ions and in particular sodium ions for ammonium or hydrogen ions to form the so-called ammonium and H forms of the beryllium zeolites. These may then be converted by calcination to highly active sorption compositions or catalysts.

The beryllium zeolites D are particularly suitable as substitutes for the pure alumino-silicates used in prior art industrial processes involving absorption or catalysis.

The synthesis of beryllium zeolites is illustrated below with reference to the following Examples.

The following starting materials were used in the tests described in the following Examples:
1. SiO₂ sol containing 32.2% w/w of SiO₂,
2. commercial sodium aluminate containing 34.6% of Na₂O, 50.7% of Al₂O₃ and 14.7% of H₂O, by weight,
3. commercial sodium hydroxide containing 77.5% w/w of Na₂O and
4. sodium beryllate solution prepared from beryllium nitrate by precipitating beryllium hydroxide with the calculated amount of sodium hydroxide and dissolving the washed beryllium hydroxide in sodium hydroxide. The solution had the following molar composition: 0.1316 mole of BeO, 0.263 mole of Na₂O and 4.47 moles of H₂O in 100 g of solution.

EXAMPLE 1

2.88 g of sodium aluminate (2) were dissolved in 10 g of water and to the clear solution there were added 17.2 g of sodium beryllate solution (4). The resulting solution was added, at room temperature and with stirring, to 93 g of SiO₂ sol (1) and stirred thoroughly. The resulting reaction mixture had the following composition, expressed in terms of oxide molar ratios:

| | | |
|---|---|---|
| BeO/Al₂O₃ | = | 2.0 |
| H₂O/Na₂O | = | 92 |
| SiO₂/Al₂O₃ | = | 35 |
| Na₂O/SiO₂ | = | 0.108 |

The mixture was placed in a Carius tube and, after sealing of the latter, heated at 175° C under autogenous pressure. The mixture was held at this temperature for 24 hours until a crystalline product had formed. The crystalline product was filtered, washed and dried. X-ray findings show that this product consists of 100% crystalline beryllium zeolite (rhombic D type). Analysis shows a molar ratio of BeO to Al₂O₃ of 1.54:1 and a molar ratio of SiO₂ to Al₂O₃ of 30:1.

EXAMPLES 2 to 12

The procedure of Example 1 was followed in the following Examples 2 to 12. The different reaction conditions and the results are listed in Table I below.

Table I

| | | | Molar composition of reaction mixture | | | | Molar composition of beryllium zeolite | | | Lattice constant (A) |
|---|---|---|---|---|---|---|---|---|---|---|
| Ex. | °C | Time (hrs) | SiO₂/Al₂O₃ | BeO/Al₂O₃ | Na₂O/SiO₂ | H₂O/Na₂O | Na₂O/Al₂O₃ | SiO₂/Al₂O₃ | BeO/Al₂O₃ | |
| 2 | 175 | 37 | 22 | 1.0 | 0.118 | 85 | 1.48 | 20 | 0.83 | — |
| 3 | 175 | 37 | 15.6 | 0.4 | 0.118 | 60 | — | — | 0.38 | — |
| 4 | 175 | 20 | 15.6 | 0.4 | 0.192 | 64 | 1.33 | 15.7 | 0.21 | — |
| 5 | 175 | 37 | 47 | 3.0 | 0.152 | 105 | 3.03 | 41 | 2.0 | — |
| 6 | 175 | 37 | 60 | 4.0 | 0.152 | 105 | 3.45 | 47 | 2.34 | — |
| 7 | 175 | 37 | 72 | 5.0 | 0.154 | 103 | 3.85 | 53 | 2.87 | — |
| 8 | 175 | 37 | 84 | 6.0 | 0.156 | 102 | 4.17 | 58 | 3.25 | — |
| 9 | 150 | 34 | 108 | 7.0 | 0.140 | 114 | 5.46 | 60 | 4.0 | — |
| 10 | 150 | 37 | 150 | 9.0 | 0.127 | 125 | — | — | — | a₀ = 20.06<br>b₀ = 18.05<br>c₀ = 7.42 |
| 11 | 150 | 37 | 60 | 4.0 | 0.152 | 105 | 3.35 | 43 | 2.5 | — |
| 12 | 175 | 37 | 11 | — | 0.118 | 85 | 1.1 | 12 | — | a₀ = 20.30<br>b₀ = 18.17<br>c₀ = 7.51 |

We claim:
1. Crystalline beryllo-alumino-silicates having the molar composition:

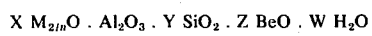

X M₂/ₙO . Al₂O₃ . Y SiO₂ . Z BeO . W H₂O in which M denotes at least one exchangeable cation and n is its valency and the coefficients have the following values: X from 0.8 to 11.2, Y from 10 to 120, Z from 0.01 to 10 and W from 0 to 7, and also having an X-ray diffraction pattern having at least the following d-values in angstrom units:

| d (Å) |
|---|
| 13.50 ± 0.25 |
| 10.00 ± 0.25 |
| 9.00 ± 0.25 |
| 6.50 ± 0.20 |
| 6.40 ± 0.20 |

-continued

| |
|---|
| 6.00 ± 0.20 |
| 5.80 ± 0.20 |
| 4.50 ± 0.15 |
| 4.00 ± 0.15 |
| 3.47 ± 0.15 |
| 3.39 ± 0.1 |
| 3.21 ± 0.1 |
| 3.19 ± 0.1 |

* * * * *